US012797758B2

(12) United States Patent
Pagliuca

(10) Patent No.: US 12,797,758 B2
(45) Date of Patent: Nov. 17, 2026

(54) SYSTEM AND METHOD FOR PROVIDING DYNAMIC AND PERSONALIZED ATTRIBUTES IN A RIDE VEHICLE

(71) Applicant: Universal City Studios LLC, Universal City, CA (US)

(72) Inventor: Angelo Pagliuca, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 811 days.

(21) Appl. No.: 18/095,272

(22) Filed: Jan. 10, 2023

(65) Prior Publication Data

US 2024/0226760 A1 Jul. 11, 2024

(51) Int. Cl.
*A63G 31/16* (2006.01)
*A63G 31/02* (2006.01)
*G06F 3/04847* (2022.01)

(52) U.S. Cl.
CPC ............ *A63G 31/16* (2013.01); *A63G 31/02* (2013.01); *G06F 3/04847* (2013.01)

(58) Field of Classification Search
CPC .......... A63G 31/16; A63G 31/02; A63G 7/00; A63G 31/00; G06F 3/04847; A63F 13/22; A63F 13/235; A63F 13/28; A63F 13/48; A63F 13/69; A63F 13/79
See application file for complete search history.

(56) References Cited

U.S. PATENT DOCUMENTS 9,751,022 B1 9/2017 Fram
10,737,186 B2 8/2020 Morosini
2007/0121957 A1 5/2007 Trowbridge et al.
2016/0171637 A1* 6/2016 Rai ....................... H04L 67/306 705/13
2017/0021282 A1* 1/2017 Comploi .............. G05D 1/0088
2017/0285636 A1 10/2017 Russell et al.
2018/0253905 A1* 9/2018 McCracken .......... A63F 13/213
2018/0369702 A1* 12/2018 Hake ...................... A63G 25/00
2019/0004598 A1* 1/2019 Gordt ....................... A63G 7/00
2020/0098190 A1* 3/2020 Goergen ............. A63F 13/5255
2022/0358687 A1 11/2022 Lenke et al.
2025/0025774 A1* 1/2025 Aman ...................... H04Q 9/00

FOREIGN PATENT DOCUMENTS

WO 2019168937 A1 9/2019

OTHER PUBLICATIONS

2017 Lincoln MKZ Owners Manual (Year: 2017).*
PCT/US2024/010883 International Search Report and Written Opinion mailed May 6, 2024.
Medgadget Editors, "Biosensors Help Build Personalized Amusement Rides," Mar. 9, 2009, 3 pgs, https://www.medgadget.com/2009/03/biosensors_help_build_personalized_amusement_rides.html.

* cited by examiner

*Primary Examiner* — Bryan Earles
(74) *Attorney, Agent, or Firm* — Fletcher Yoder, P.C.

(57) ABSTRACT

A ride vehicle includes one or more seats, each seat of the one or more seats configured to seat a respective passenger. The ride vehicle also includes a controller configured to receive input from each passenger on or preparing to board the ride vehicle prior to a beginning of a ride cycle of a ride and to adjust operation of a respective seat of the one or more seats during the ride cycle for each respective passenger based on the input received from the respective passenger, wherein the input includes selections of desired levels for one or more ride attributes.

19 Claims, 3 Drawing Sheets

SYSTEM AND METHOD FOR PROVIDING DYNAMIC AND PERSONALIZED ATTRIBUTES IN A RIDE VEHICLE

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Since the early twentieth century, amusement parks (or theme parks) have substantially grown in popularity. Certain amusement park rides have been created to provide riders with unique experiences. However, on some attractions multiple guests want to experience the same attraction differently. In particular, guests may have different thresholds of tolerance. Accordingly, it may be desirable, to provide a ride vehicle that accommodates for the different thresholds of tolerance of the guests, thus, enabling a wider range of guests to participate in the ride experience.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a ride vehicle includes one or more seats, each seat of the one or more seats configured to seat a respective passenger. The ride vehicle also includes a controller configured to receive input from each passenger on or preparing to board the ride vehicle prior to a beginning of a ride cycle of a ride and to adjust operation of a respective seat of the one or more seats during the ride cycle for each respective passenger based on the input received from the respective passenger, wherein the input includes selections of desired levels for one or more ride attributes.

In an embodiment, a ride vehicle controller includes a memory configured to store processor-executable routines. The ride vehicle controller also includes a processor configured to access the memory and to execute the processor-executable routines, wherein the routines, when executed by the processor, cause the processor to perform acts. The acts include receiving input from each passenger on or preparing to board a ride vehicle prior to a beginning of a ride cycle of a ride, wherein the ride vehicle includes one or more seats. The acts also include adjusting operation of a respective seat of the one or more seats during the ride cycle for each respective passenger based on the input received from the respective passenger, wherein the input includes selections of desired levels for a plurality of ride attributes.

In an embodiment, a method for personalizing attributes in a ride vehicle includes receiving, at a controller of the ride vehicle, input from each passenger on or preparing to board the ride vehicle prior to a beginning of a ride cycle of a ride, wherein the ride vehicle includes one or more seats. The method also includes adjusting, via the controller, operation of a respective seat of the one or more seats during the ride cycle for each respective passenger based on the input received from the respective passenger, wherein the input includes selections of desired levels for a plurality of ride attributes.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
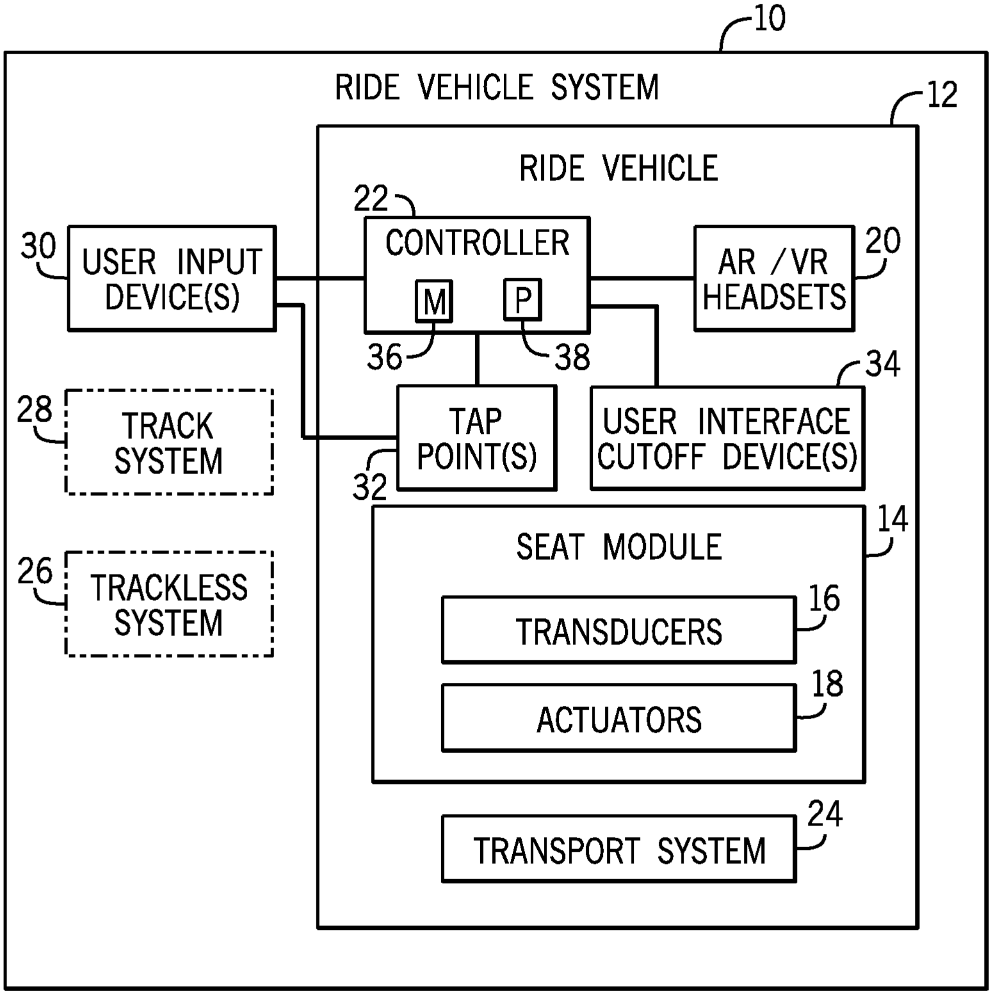
FIG. 1 is a schematic view of components of a ride vehicle system of an amusement attraction, in accordance with an aspects of the present disclosure.

The present disclosure relates generally to systems and method for providing dynamic and personalized attributes in a ride vehicle.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are directed to systems and method for providing dynamic and personalized attributes in a ride vehicle. In particular, a guest (e.g., rider) may provide an input of personalized attributes into a dynamic vehicle through a guest profile to experience the ride as they desire. The guest may be able to input (prior to the ride) the desired ride attributes through their own personal device (e.g., a smart phone, tablet, or other computing device running a platform such as an application owned by the provider of the attraction) or a peripheral device given to the guest prior to the ride.

In an embodiment, the ride vehicle includes a plurality of seats. The overall group of guests on this type of ride vehicle may be limited to a similar point of view and timing of the attraction, while each seat has transducers (e.g., haptics) and movements (e.g., via actuators) self-contained within to vary the ride experience for each guest. Each guest can input their own desired levels of a plurality of ride attributes to customize their ride experience. In an embodiment, a controller (e.g., ride vehicle controller) is configured to adjust a respective seat of the plurality of seats during a ride cycle (e.g., during of ride occurring) of the ride for each respective passenger based on (e.g., specific to) the input received from the respective passenger. For example, adjusting actuators of movement of the respective seat and/or adjusting transducers within the respective seat may occur based on the input received from the guest. In an embodiment, each seat of the plurality of seats includes an augmented reality (AR) or virtual reality (VR) device configured to be worn by a seated passenger during the ride cycle to enable the seated passenger to interact with an augmented or virtual environment of the ride. In these embodiments, the ride vehicle controller is configured to adjust one or more attributes of an augmented reality or virtual reality experience via the augmented reality or virtual reality device during the ride cycle based on the input received from the respective passenger.

In an embodiment, the ride vehicle controller may receive additional input from the respective passenger during the ride cycle via the personal device or the peripheral device. Based on this additional input, the controller adjusts the respective seat of the respective passenger based on the additional input. The additional input includes a change in a desired level for at least one ride attribute of the plurality of ride attributes. In an embodiment, the ride vehicle includes a plurality of user interface cutoff devices (e.g., button, switch, etc.) and a respective user interface cutoff device is disposed adjacent to and associated with each respective seat. The ride vehicle controller may reduce, during the ride cycle, each ride attribute of the plurality ride attributes to a respective lowest level based on an additional input received during the ride from the respective passenger via a respective user interface cutoff device.

In an embodiment, the ride vehicle controller is configured to determine which seat of the plurality of seats each respective passenger is seated in. This may be achieved via a dedicated communication port integrated or associated with a respective seat. For example, if data is entered into a communication port for a particular seat, that data will be associated with the particular seat. In an embodiment, this determination is based on communication between the respective personal device or the respective peripheral device and the ride vehicle. In particular, the ride vehicle may include a plurality of tap points (e.g., near-field wireless communicators) with a respective tap point disposed adjacent to and associated with each respective seat. The communication (e.g., near-field communication) is between the respective personal device or the respective peripheral device and the plurality of tap points. The guest may tap the tap point or distance communication (e.g., via antennas) may be utilized between the tap points and the personal devices or peripheral devices. In an embodiment, the ride vehicle controller is configured to assign seats to the passengers prior to the ride (i.e., prior to the loading of the ride) based on the input received from each respective passenger. Proper seating arrangements may be confirmed by confirming the presence of the appropriate personal device or peripheral device via one or more near-field communicators. In addition, other information such as number of guests, ages of guests, and/or other restrictions may also be utilized by the ride vehicle controller in assigning the seats.

In an embodiment, the ride vehicle is configured for a single passenger (e.g., by having a single seat). Based on input from the passenger, the ride vehicle controller may adjust handling characteristics of the whole ride vehicle (e.g., acceleration, speed, braking, etc.). Thus, not only tolerances, but skill of the guest may be considered (as well as their party). In certain embodiments, guests with similar selected levels of ride attributes (e.g., as entered prior to ride vehicle entry) may be assigned to the same ride vehicle.

The disclosed embodiments allow each guest to have a customized ride experience. Thus, all guests (including guests with differing preferences for ride conditions) get to experience a similar attraction but under different conditions. In embodiments, where the ride vehicle has seats for multiple passengers, on the same ride vehicle each guest may experience the same ride under different (personalized) conditions. It should be noted a similar customized ride experience may be utilized on a ride where the guests stand.

FIG. 1 is a schematic view of an embodiment of the components of a ride vehicle system 10 of an amusement attraction. The ride vehicle system 10 includes a ride vehicle 12. The ride vehicle 12 includes one or more seats or seat modules 14. In an embodiment, the ride vehicle 12 includes a plurality of seat modules 14 configured to seat multiple passengers (see FIG. 6 with the ride vehicle 12 seating passengers 15). In an embodiment, the ride vehicle 12 includes a single seat module 14 for seating of a single passenger.

Each seat module 14 may include one or more condition controls, such as transducers 16. The transducers 16 may be disposed within various components of the seat module 14. For example, an audible output may be provided to a passenger via a speaker. The seat module 14 may include tactile transducers that provide stimuli to different parts of the passenger (e.g., face, hands, back, etc.). For example, air or water may be directed at the passenger or the seat module 14 may be vibrated with or without a substantially audible sound. Also, a scent may be released. Also, haptic stimuli may be provided by an object pushing against, pulling towards, and/or contacting a portion of the passenger. Also, a temperature of a portion of the seat module 14 may be adjusted to provide a stimulus. These transducers 16 may be adjusted during a ride based on selected desired ride attributes 54 inputted by a passenger (e.g., prior to and/or during the ride).

Each seat module 14 may include condition controls, such as actuators 18 for moving the seat module 14. In an embodiment, the actuators 18 may cause the seat module 14 to move up and down, to move side to side, to move backward and forward, and/or to change an incline in any one of these directions of the seat module 14. These actuators 18 may be adjusted during a ride based on selected desired ride attributes 54 inputted by a passenger (e.g., prior to and/or during the ride).

The ride vehicle 12 may also include AR or VR devices 20 for each passenger to wear on their head during the ride that enables the passenger to interact with an AR or VR environment related to the theme of the ride. The AR or VR device 20 for each seat module 14 may be coupled (e.g., physically, electronically, communicatively, etc.) to the respective seat module 14 and/or the ride vehicle 12. Each AR or VR device 20 may be coupled to a controller 22 (e.g., ride vehicle controller) of the ride vehicle 12 (e.g., located on, or in, or remotely from the ride vehicle 12). The augmented reality or virtual reality experience may be adjusted during a ride based on selected desired ride attributes 54 inputted by a passenger (e.g., prior to and/or during the ride).

The ride vehicle 12 includes a transport system 24 to move the ride vehicle 12 along the ride environment. In an embodiment, the transport system 24 may interact with a platform to form a motion base or reaction deck. In an embodiment, the transport system 24 may act as an automated guide vehicle (AGV) in moving the ride vehicle 12 along its path through the ride environment (e.g., trackless environment). Thus, in an embodiment, the ride system 10 includes a trackless system 26 for transport of the ride vehicles 12 (e.g., utilizing AGVs). In an embodiment, the transport system 24 may include wheels, linkages, and other devices to enable the different movements of the ride vehicle 12. Thus, in an embodiment, the ride system 10 includes a track system 28 for transport of the ride vehicles 12. In an embodiment, the transport system 24 may be coupled to a track to enable movement of the ride vehicle 12 along the track in the ride environment. In an embodiment (e.g., when the ride vehicle 12 is configured for a single passenger), the transport system 24 includes certain components (e.g., brakes, suspension, etc.) that may be adjusted within a given range (e.g., acceptable for safe operation of the ride vehicle 12) based on selected desired ride attributes 54 inputted by a passenger (e.g., prior to and/or during the ride).

The ride vehicle system 10 may include or coordinate with user input devices 30. In an embodiment, the user input devices 30 are peripheral devices provided to the guests prior to getting on the ride vehicle 12 or when they get on the ride vehicle 12. In an embodiment, the user input devices 30 are guests' personal devices (e.g., smart phone, tablet, or other computing device). In an embodiment, the user input devices 30 (e.g., integrated data entry pads or touch screens) may be integrated into the ride vehicle 12 with a user input device 30 associate with each respective seat module 14. The user input devices 30 may include a platform such as an application owned by the provider of the attraction. Prior to the ride, the guest may create (e.g., via the application) a guest profile. In this guest profile, the guest may provide information such as age, height, experience level with a ride, and/or other personal information. In addition, in the guest profile, the guest may input (e.g., via the application) selections of desired levels for a plurality of ride attributes 54. In an embodiment (e.g., when the ride vehicle 12 includes a plurality of seat modules 14), these inputted selections (e.g., provided prior to and/or during the ride) may adjust a respective seat module 14 of the passenger, an augmented reality or virtual reality experience, or other characteristic of the ride during ride operation. In an embodiment (e.g., when the ride vehicle 12 is configured for a single passenger), these inputted selections (e.g., provided prior to and/or during the ride) may adjust the handling characteristics of the whole ride vehicle 12 (e.g., acceleration, speed, braking, etc.).

The passengers may communicate with the ride vehicle 12 to determine (e.g., via the ride vehicle controller 22) where each passenger is seated. In an embodiment, the ride vehicle 12 may include a plurality of tap points 32 with a respective tap point 32 disposed adjacent to and associated with each respective seat module 14. Each tap point 32 is coupled to the ride vehicle controller 22. The passenger may utilize the user input device 30 to communicate (e.g., via near-field communication) with the tap point 32 associated with a respective seat module 14. In an embodiment, the passenger may tap the tap point 32. In an embodiment, the passenger's user input device 30 may distantly communicate (e.g., via antennas) with the tap point 32.

In an embodiment, the ride vehicle 12 may also include a plurality of user interface cutoff devices 34 (e.g., buttons, switches, etc.) with a respective user interface cutoff device 34 disposed adjacent to and associated with each respective seat module 14. Each user interface cutoff device 34 is coupled to the ride vehicle controller 22. The ride vehicle controller 22 may reduce, during the ride, each ride attribute of the plurality ride attributes 54 to a respective lowest level for a respective passenger based on an additional input received during the ride from the respective passenger via a respective user interface cutoff device 34. In an embodiment, a similar request to lower each of the ride attributes 54 to their minimal level may be made by the passenger via the user input device 30.

The ride vehicle controller 22 may be disposed within the ride system 10 (e.g., in each ride vehicle 12 (as depicted), or somewhere throughout the ride environment), or may be disposed outside of the ride system 10 (e.g., to operate the ride system 10 remotely). The controller 22 may include a memory 36 with stored instructions for controlling components in the ride system 10 and the ride vehicle 12 (e.g., AR or VR devices 20, transducers 16, actuators 18, transport system 24, etc.). In addition, the controller 22 may include a processor 38 configured to execute such instructions. For example, the processor 38 may include one or more application specific integrated circuits (ASICs), one or more field programmable gate arrays (FPGAs), one or more general purpose processors, or any combination thereof. Additionally, the memory 36 may include volatile memory, such as random-access memory (RAM), and/or non-volatile memory, such as read-only memory (ROM), optical drives, hard disc drives, or solid-state drives.

The ride vehicle controller 22 is configured to receive input (prior to and/or during the ride) from one or more passengers for a ride via respective user input devices 30, where the input includes selections of desired levels for a plurality of ride attributes 54. The controller 22 is configured to adjust a respective seat module 14 for a respective passenger during the ride based on (e.g., specific to) the input received from the respective passenger. For example, adjusting the actuators 18 of movement of the respective seat module 14 and/or adjusting the transducers 16 within the respective seat module 14 may occur based on the input received from the passenger. The controller 22 may also be configured to adjust one or more attributes of an augmented reality or virtual reality experience via the augmented reality or virtual reality device 20 during the ride based on the input received from the respective passenger. In an embodiment (e.g., where the ride vehicle 12 is configured for a single passenger), the controller 22 is configured to adjust the ride the handling characteristics of the whole ride vehicle 12 (e.g., acceleration, speed, braking, etc.) based on the input received via the user input device 30 from the passenger). For example, a seat height may be adjusted on a desire for a more impactful ride (e.g., more centrifugal force). As another example, a degree as to how fast a seat may move in certain directions may be altered.

The ride vehicle controller 22 is also configured to receive additional input from the respective passenger during the ride via the user input device 30. Based on this additional input, the controller 22 adjusts the respective seat module 14 of the respective passenger based on the additional input. The additional input may include a change in a desired level for at least one ride attribute of the plurality of ride attributes 54. In an embodiment, the controller 22 is configured to reduce, during the ride, each ride attribute of the plurality ride attributes 54 to a respective lowest level based on an additional input received during the ride from the respective passenger via a respective user interface cutoff device 34.

The ride vehicle controller 22 is further configured to determine which seat module 14 each respective passenger is seated in. In an embodiment, this determination is based on communication between the respective user input device 30 and the tap point 32 associated with the seat module 14 that the respective passenger is seated in. In an embodiment, the controller 22 is configured to assign seat modules 14 to the passengers prior to the ride based on the input received from each respective passenger (via a respective user input device 30). In addition, other information such as number of guests, ages of guests, and/or other restrictions may also be utilized by the controller 22 in assigning the seats. The user input devices 30 interacting with the tap points 32 may be utilized to confirm the guests are sitting in the correct assigned seat module 14. In certain embodiments, the tap points 32 may be utilized to guide the guests to the correct assigned seats (e.g., via color coding or the tap points 32 may include a display for a number assigned to the passenger).

Figure 2:
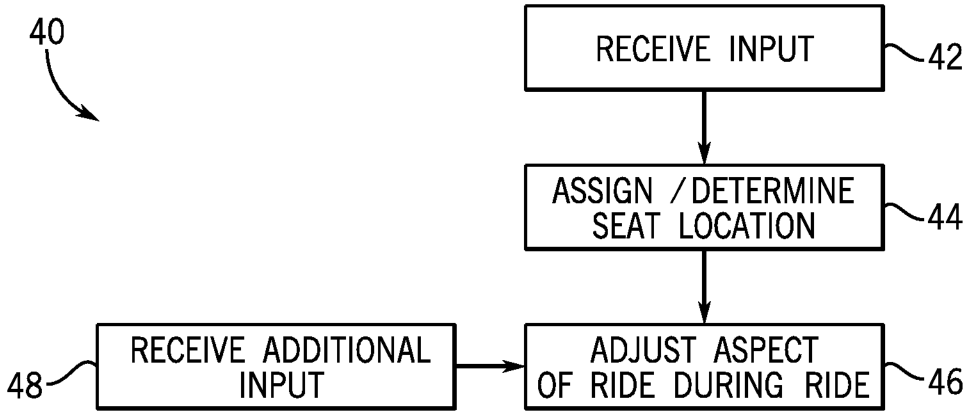
FIG. 2 is a flow chart of a method for providing dynamic and personalized attributes in a ride vehicle in a ride environment, in accordance with aspects of the present disclosure.

FIG. 2 is a flow chart of a method 40 for providing dynamic and personalized attributes in a ride vehicle (e.g., ride vehicle 12 in FIG. 1) in a ride environment. The method 40 may be performed by one or more components of the ride system in FIG. 1 (e.g., ride vehicle controller 22). In accordance with present embodiments, one or more steps of the method 40 may be performed simultaneously or in a different order from that depicted in FIG. 2.

The method 40 includes receiving input from one or more passengers on the ride vehicle 12 prior to a beginning of a ride (even prior to getting on the ride) (block 42). For example, guests may be given a device to enter the inputs while in a queue or may be prompted to enter the inputs on a personal device that is employing an app linked to the ride system. In a ride vehicle 12 that seats more than one passenger, inputs may be received from more than one passenger. In a ride vehicle 12 that seats a single passenger, the input is received from the single passenger. The input from each passenger is received from a user input device (e.g., user input device 30 in FIG. 1). In an embodiment, the input includes selections of desired levels for a plurality of ride attributes 54. In an embodiment, the input also includes a guest profile that includes relevant information for the ride (e.g., age, height, and/or other personal information). In an embodiment, the input is received via a tap point (e.g., tap point 32) associated with a respective seat (e.g., seat module 14 in FIG. 1) in communication with the user input device of a respective passenger. The tap point (e.g., tap point 32) may be located on the ride vehicle 12 or just prior to entering the ride vehicle 12, such as on a kiosk on a loading platform.

The method 40 (when the ride vehicle 12 is configured for multiple passengers) also includes assigning or determining a seat location for each respective passenger on the ride vehicle 12 (block 44). In an embodiment, the seat location is determined by input received from a respective passenger at a respective seat via communication between the user input device of the respective passenger and the tap point 32 associated with the respective seat. In an embodiment, the seat location is assigned based on the input received from each respective passenger (via a respective user input device 30) related to the personalized selection of desired levels of ride attributes 54. In addition, other information such as number of guests, ages of guests, and/or other restrictions may also be utilized in assigning the seats. For example, guests that are riding together may be assigned seats next to each other. In an embodiment, guests may be guided to their seat by turning a screen of the respective portable user input device of the guest a certain color and activating seat lights associated with the assigned seat to the same color. This enables the guest to intuitively know where to sit. In addition, this enables ride managers to confirm that the guest is sitting in the correct seat. In certain embodiments, a light (e.g., LED) associated with each seat may turn a specific color (e.g., green when the correct guest is seated in a respective seat.

The method 40 further includes adjusting an aspect of the ride for a respective passenger during the ride based on the input received related to the personalized selection of desired levels of ride attributes 54 (block 46). In an embodiment, adjusting an aspect of the ride includes adjusting a respective seat during the ride for the respective passenger (e.g., adjusting actuators 18 of movement for the respective seat and/or adjusting transducers 16 within the respective seat). In an embodiment, adjusting an aspect of the ride includes adjusting one or more attributes of an augmented reality or virtual reality experience via the augmented reality or virtual reality device during the ride for the respective passenger. In an embodiment (e.g., when the ride vehicle 12 is configured for a single passenger), adjusting an aspect of the ride includes adjusting handling characteristics of the whole ride vehicle 12 (e.g., acceleration, speed, braking, etc.) during the ride.

In an embodiment, the method 40 includes receiving additional input during the ride (block 48). The additional input may be received from the respective passenger via the respective user input device and the additional input relates to a change in a desired level for one or more ride attributes 54. Based on this additional input, the method 40 adjusts at least one aspect of the ride during the ride (block 46). In an embodiment, the additional input relates to changing each ride attribute to a lowest level. In an embodiment, this input to change each ride attribute to a lowest level may be provided via a user interface cutoff device (e.g., user interface cutoff device 34 in FIG. 1). Based on this additional input, the method 40 also adjusts at least one aspect of the ride (e.g., movement of seat, augmented or virtual environment experienced via an AR/VR device, etc.) during the ride (block 46).

Figure 3:
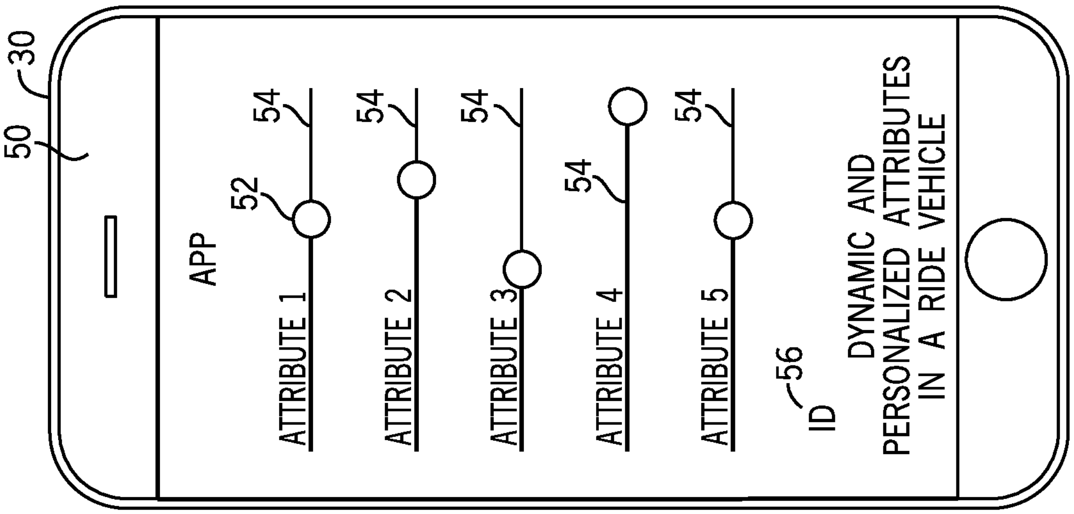
FIG. 3 is a schematic diagram of a user interface for a user input device having selections for ride attributes (e.g., general ride attributes), in accordance with aspects of the present disclosure.

FIG. 3 is a schematic diagram of a user interface 50 for the user input device 30 having selections for ride attributes 54 (e.g., depicting general ride attributes). The user input device 30 may be a personal device of the guest (e.g., a smart phone, tablet, or other computing device) or a peripheral device given to the guest prior to the ride. As depicted in FIG. 3, the user input device 30 is running a platform such as an application owned by the provider of the attraction. The user interface 50 enables the guest to dynamically select (e.g., via a slider 52) a desired level for a plurality of ride attributes 54. As depicted, 5 ride attributes 54 are provided for selection of levels. The number of ride attributes 54 provided for selection may vary (e.g., 2, 3, 4, 5, 6, or more ride attributes 54). Other means besides a slider 52 may be utilized for selecting the desired level for the ride attribute 54. For example, a desired level (e.g., numerical value within a given range) may be inputted. The desired level may be inputted via a touchscreen, keyboard, button, or other device. As depicted, a continuous or dynamic range is provided for selection of the levels of the ride attributes 54. In an embodiment, discrete levels may be provided for selection among the ride attributes 54. In an embodiment (e.g., when the ride vehicle 12 is configured for a single passenger), the guest may be offered a narrower range of levels to select from among the attributes 54 the first time the guest rides the ride. But in subsequent rides the available range of levels may be increased upon the guest demonstrating proficiency during the first ride or a previous ride. In an embodiment, based upon guest information provided in a guest profile (e.g., age, height, experience level with the ride, etc.), the range of levels for selection among the ride attributes 54 may be altered (e.g., narrowed, expanded, etc.). The user interface 50 also includes an identification 56 for the guest (it could be a number, a combination of numbers, letters, and/or symbols, or a name (e.g., real or made up)).

Figure 4:
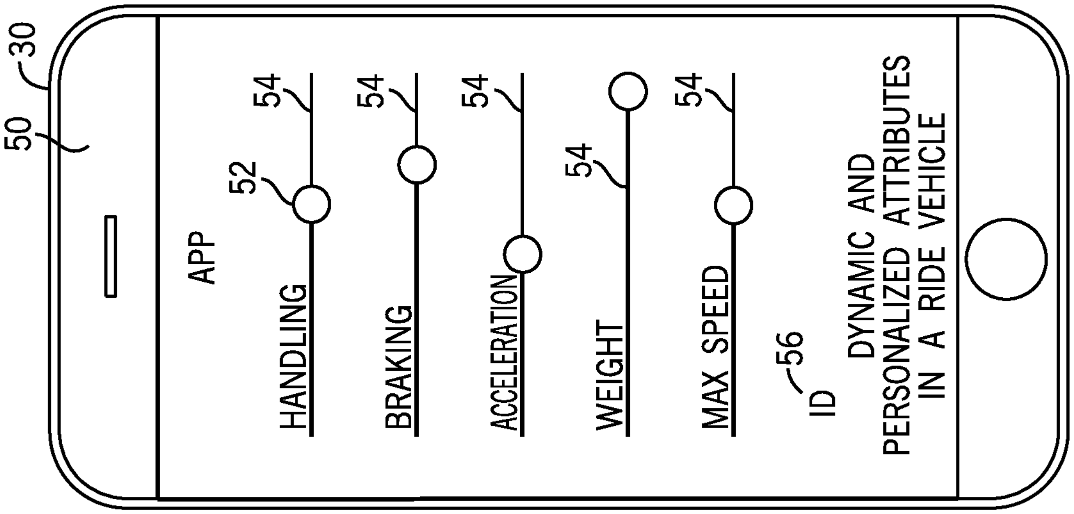
FIG. 4 is a schematic diagram of a user interface for a user input device having selections for ride attributes (e.g., specific ride attributes), in accordance with aspects of the present disclosure.

FIG. 4 is a schematic diagram of a second user interface 58 for the user input device 30 having selections for ride attributes 54. The second user interface 58 and the user input device 30 are as described in FIG. 3 except the second user interface 58 has specific examples for the ride attributes 54. As depicted in FIG. 4, the ride attributes 54 include handling, braking, acceleration, weight, and maximum speed. In certain embodiments, the second user interface may include other ride attributes 54. In an embodiment, these ride attributes 54 may be specific for a ride vehicle 12 configured for a single passenger. In other embodiment, fewer, more, or different ride attributes 54 may be listed and controlled.

Figure 5:
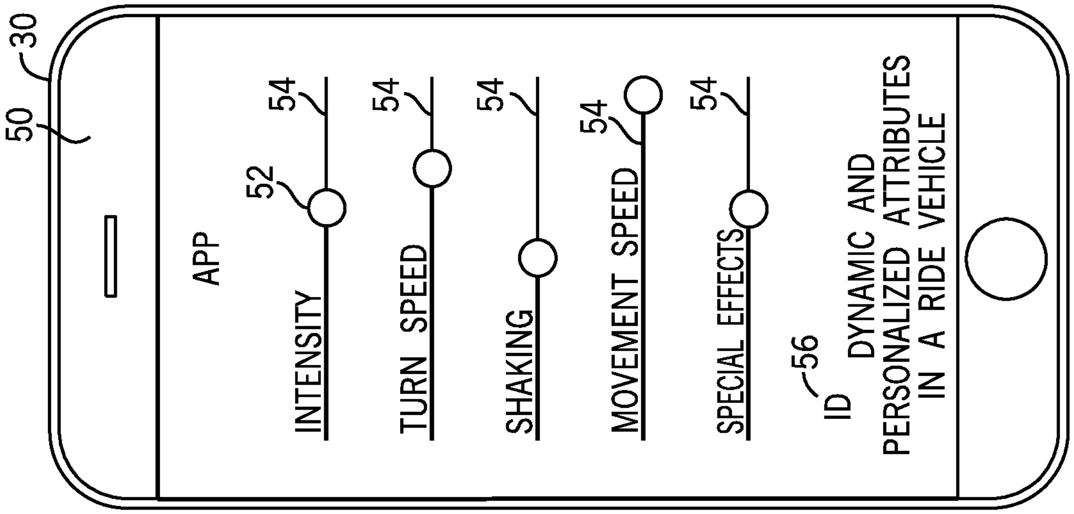
FIG. 5 is a schematic diagram of a user interface for a user input device (e.g., another set of specific ride attributes), in accordance with aspects of the present disclosure.

FIG. 5 is a schematic diagram of a third user interface 60 for the user input device 30 having selections for ride attributes 54. The third user interface 60 and the user input device 30 are as described in FIG. 3 except the second user interface 58 has additional specific examples for the ride attributes 54. As depicted in FIG. 5, the ride attributes 54 include intensity, turn speed, shaking, movement speed, and special effects. It should be noted that the ride attributes 54 shown in FIGS. 4 and 5 are just some of the ride attributes 54 that may be utilized for a ride and that other ride attributes 54 may be utilized in addition to and/or instead of those depicted.

Figure 6:
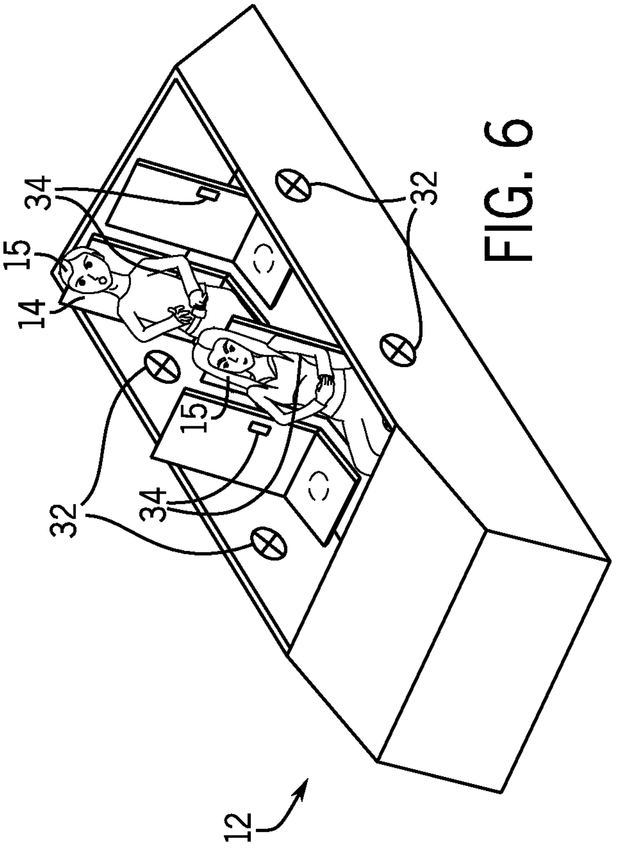
FIG. 6 is a schematic perspective view of a ride vehicle having multiple seat modules, in accordance with aspects of the present disclosure.

FIG. 6 is a schematic perspective view of the ride vehicle 12 having multiple seat modules 14. As depicted, the ride vehicle 12 includes 4 seat modules 14. The number of seat modules 14 in the ride vehicle 12 may vary (e.g., 2, 3, 4, 5, 6, 7, 8, or more seat modules 14). In an embodiment, the ride vehicle 12 may only have a single seat module 14 and be configured for a single passenger.

As depicted in FIG. 6, the ride vehicle 12 includes a plurality of tap points 32 with a respective tap point 32 disposed adjacent to and associated with each respective seat module 14. Each tap point 32 is coupled (e.g., via a wireless or wired coupling) to the ride vehicle controller (e.g., ride vehicle controller 22 in FIG. 1). The passenger may utilize a respective user input device (e.g., user input device 30 in FIG. 1) to communicate (e.g., via near-field communication) with the tap point 32 associated with each respective seat module 14. For example, each tap point 32 may include an NFC tag (e.g., having a small system on a chip (e.g., integrated circuit) and antenna placed behind printed icon or sticker) for communication with the user input device. In an embodiment, the passenger may actually tap the tap point 32. In an embodiment, the passenger's user input device may distantly communicate (e.g., via antennas) with the tap point 32.

In an embodiment, the ride vehicle 12 also includes a plurality of user interface cutoff devices 34 (e.g., buttons, switches, etc.) with a respective user interface cutoff device 34 disposed adjacent to and associated with each respective seat module 14. Each user interface cutoff device 34 is coupled to the ride vehicle controller 22. The ride vehicle controller 22 may reduce, during the ride, each ride attribute of the plurality ride attributes 54 to a respective lowest level for a respective passenger based on an additional input received during the ride from the respective passenger via a respective user interface cutoff device 34.

Figure 7:
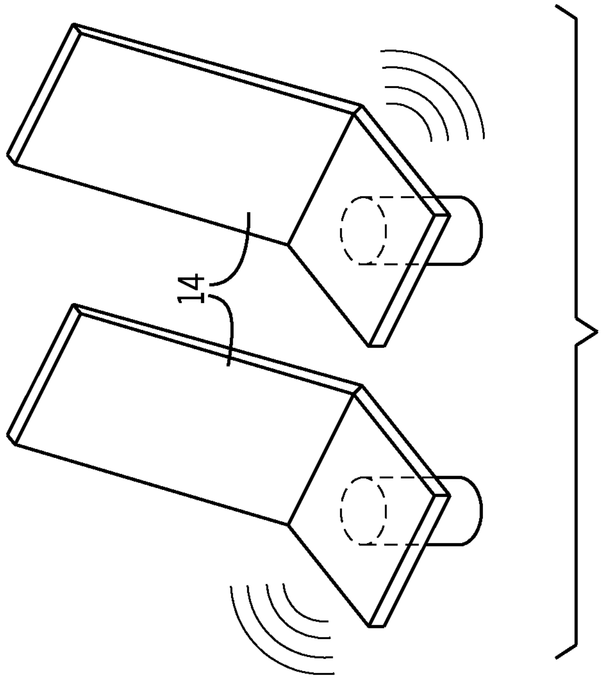
FIG. 7 is a schematic perspective view of seat modules for the ride vehicle in FIG. 6, in accordance with aspects of the present disclosure.

Each individual seat module 14 is configured to behave differently based on the different ride attributes 54 provided by each guest. FIG. 7 illustrates examples of module seats 14 in the ride vehicle 12 of FIG. 6. Different seat modules 14 will have different levels of intensity based on the guest profile associated with a respective seat module 14. In an embodiment (e.g., where the ride vehicle 12 is configured for multiple passengers), the seat module 14 is being affected by the selection of the ride attributes 54 by the guest while the ride vehicle 12 performs a consistent operation for all guests. Thus, all of the mechanics (e.g., sensors and actuators 18) are all contained within the seat module 14.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosed subject matter have been illustrated and described herein, many modifications and changes will occur to those skilled in the art. It is, therefore, to be understood that the appended claims are intended to cover all such modifications and changes as fall within the true spirit of the disclosed subject matter.

The invention claimed is:

1. A ride vehicle, comprising:

one or more seats, each seat of the one or more seats configured to seat a respective passenger; and a controller configured to receive input from each passenger on or preparing to board the ride vehicle prior to a beginning of a ride cycle of a ride and to adjust operation of a respective seat of the one or more seats during the ride cycle based on the input received from the respective passenger, wherein:

the input comprises data inputted into a respective user interface of a respective personal device or a respective peripheral device, the data comprises selections of desired levels for one or more ride attributes; and the respective seat is coupled with actuators and/or transducers configured to move the respective seat at various points throughout the ride cycle based on the data.

2. The ride vehicle of claim 1, wherein each seat of the one or more seats comprises an augmented reality or virtual reality device configured to be worn by the respective passenger during the ride cycle to enable the respective passenger to interact with an augmented or virtual environment of the ride, and wherein the controller is configured to adjust one or more attributes of an augmented reality or virtual reality experience via the augmented reality or virtual reality device during the ride cycle based on the input received from the respective passenger.

3. The ride vehicle of claim 1, wherein the controller is configured to determine which seat of the one or more seats each respective passenger is seated in based on communication between the respective personal device or the respective peripheral device and the ride vehicle.

4. The ride vehicle of claim 3, wherein the ride vehicle further comprises a plurality of tap points, and a respective tap point of the plurality of tap points is integral with or disposed adjacent to and associated with each respective seat of the one or more seats, and wherein the communication is between the respective personal device, or the respective peripheral device, and the plurality of tap points.

5. The ride vehicle of claim 1, wherein the controller is configured to assign seats to the respective passengers prior to boarding the ride vehicle based on the input received from each respective passenger.

6. The ride vehicle of claim 1, wherein the controller is configured to receive additional input from the respective passenger during the ride cycle and to adjust the respective seat of the respective passenger based on the additional input, wherein the additional input comprises a change in a desired level for at least one ride attribute of the one or more ride attributes.

7. The ride vehicle of claim 1, wherein the ride vehicle further comprises a plurality of user interface cutoff devices and a respective user interface cutoff device of the plurality of user interface cutoff devices is integral with or disposed adjacent to and associated with each respective seat of the one or more seats, and wherein the controller is configured to reduce, during the ride cycle, each ride attribute of the one or more ride attributes to a respective lowest level based on an additional input received during the ride cycle from the respective passenger via a respective user interface cutoff device of the plurality of user interface cutoff devices.

8. A ride vehicle controller, comprising:

a memory configured to store processor-executable routines; and a processor configured to access the memory and to execute the processor-executable routines, wherein the routines, when executed by the processor, cause the processor to:

receive input from each passenger on or preparing to board a ride vehicle prior to a beginning of a ride cycle of a ride, wherein the input is received from a respective personal device of each respective passenger or a respective peripheral device provided to each respective passenger, and wherein the ride vehicle comprises one or more seats; and adjust operation of a respective seat of the one or more seats during the ride cycle for each respective passenger based on the input received from the respective passenger, wherein the input comprises selections of desired levels for a plurality of ride attributes inputted via a respective user interface of the respective personal device or the respective peripheral device by each respective passenger, and wherein adjustment of the respective seat comprises adjusting actuators configured to move the respective seat and/or adjusting transducers within the respective seat at various points throughout the ride cycle.

9. The ride vehicle controller of claim 8, wherein each seat of the one or more seats comprises an augmented reality or virtual reality device configured to be worn by a passenger during the ride cycle to enable the passenger to interact with an augmented or virtual environment of the ride, and wherein the routines, when executed by the processor, cause the processor to adjust one or more attributes of an augmented reality or virtual reality experience via the augmented reality or virtual reality device during the ride cycle based on the input received from the respective passenger.

10. The ride vehicle controller of claim 8, wherein the routines, when executed by the processor, cause the processor to determine which seat of the one or more seats each respective passenger is seated in based on communication between the respective personal device, or the respective peripheral device, and the ride vehicle.

11. The ride vehicle controller of claim 10, wherein the communication between the respective personal device, or the respective peripheral device, and the ride vehicle includes communication with a plurality of tap points associated with the one or more seats of the ride vehicle.

12. The ride vehicle controller of claim 8, wherein the routines, when executed by the processor, cause the processor to assign seats to the passengers prior to boarding the ride vehicle based on the input received from each respective passenger.

13. The ride vehicle controller of claim 8, wherein the routines, when executed by the processor, cause the processor to receive additional input from a respective passenger during the ride cycle and to adjust the respective seat of the respective passenger based on the additional input, wherein the additional input comprises a change in a desired level for at least one ride attribute of the plurality of ride attributes.

14. The ride vehicle controller of claim 8, wherein the ride vehicle further comprises a plurality of user interface cutoff devices and a respective user interface cutoff device of the plurality of user interface cutoff devices is disposed adjacent to and associated with each respective seat of the one or more seats, and wherein the routines, when executed by the processor, cause the processor to reduce, during the ride cycle, each ride attribute of the plurality of ride attributes to a respective lowest level based on an additional input received during the ride cycle from the respective passenger via a respective user interface cutoff device of the plurality of user interface cutoff devices.

15. A method for personalizing attributes in a ride vehicle, the method comprising:

receiving, at a controller of the ride vehicle, input from each passenger on or preparing to board the ride vehicle prior to a beginning of a ride cycle of a ride, wherein the input is received from a respective personal device of each respective passenger or a respective peripheral device provided to each respective passenger, and wherein the ride vehicle comprises one or more seats; and adjusting, via the controller, operation of a respective seat of the one or more seats during the ride cycle for each respective passenger based on the input received from the respective passenger, wherein the input comprises selections of desired levels for a plurality of ride attributes inputted via a respective user interface of the respective personal device or the respective peripheral device by the respective passenger, and wherein adjustment of the respective seat comprises adjusting actuators configured to move the respective seat and/or adjusting transducers within the respective seat at various points throughout the ride cycle.

16. The method of claim 15, further comprising assigning, via the controller, seats of the one or more seats to the passengers prior to boarding the ride vehicle based on the input received from each respective passenger.

17. The ride vehicle of claim 1, wherein the controller is configured to receive the input from each passenger prior to boarding the ride vehicle.

18. The ride vehicle controller of claim 8, wherein the routines, when executed by the processor, cause the processor to receive the input from each passenger prior to boarding the ride vehicle.

19. The method of claim 15, further comprising receiving, at the controller, the input from each passenger prior to boarding the ride vehicle.

* * * * *